April 28, 1925.
G. A. MILBRADT
LADDER
Filed June 9, 1924
1,535,432
2 Sheets-Sheet 1
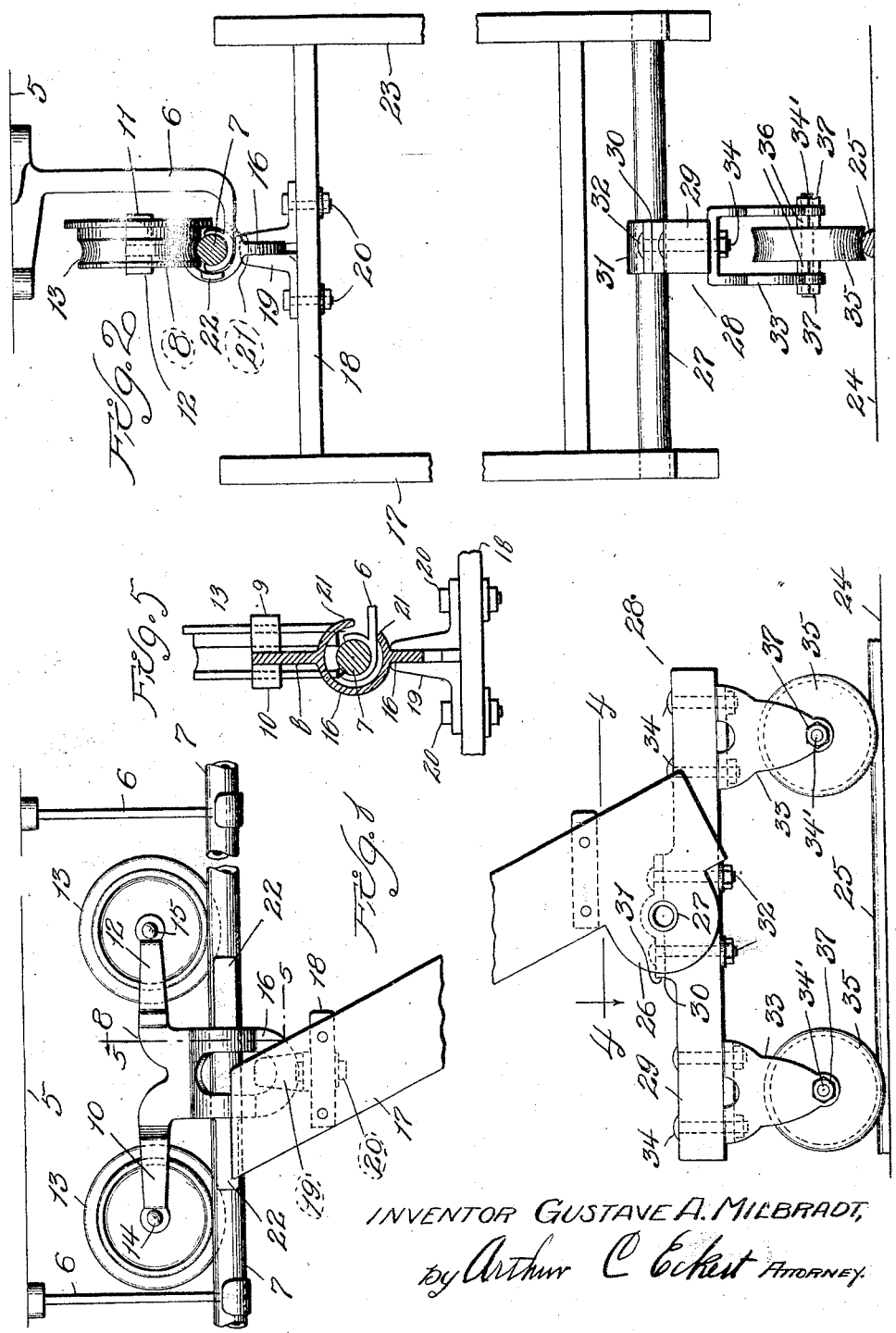
INVENTOR GUSTAVE A. MILBRADT,
by Arthur C. Eckert ATTORNEY.

April 28, 1925.
G. A. MILBRADT
LADDER
Filed June 9, 1924
1,535,432
2 Sheets-Sheet 2
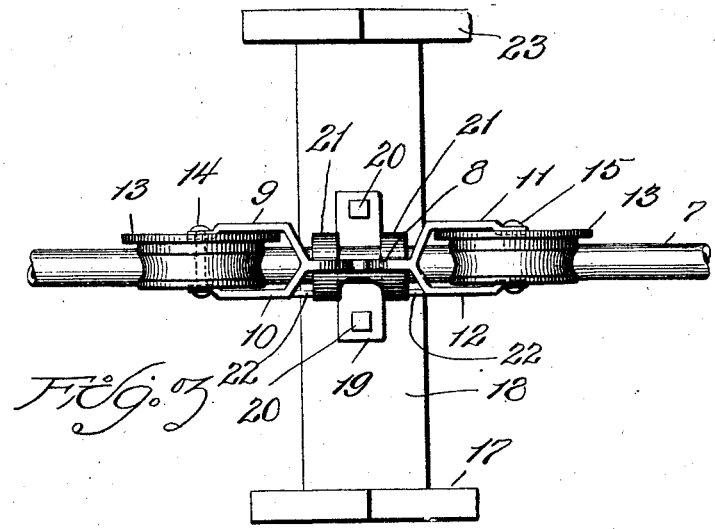
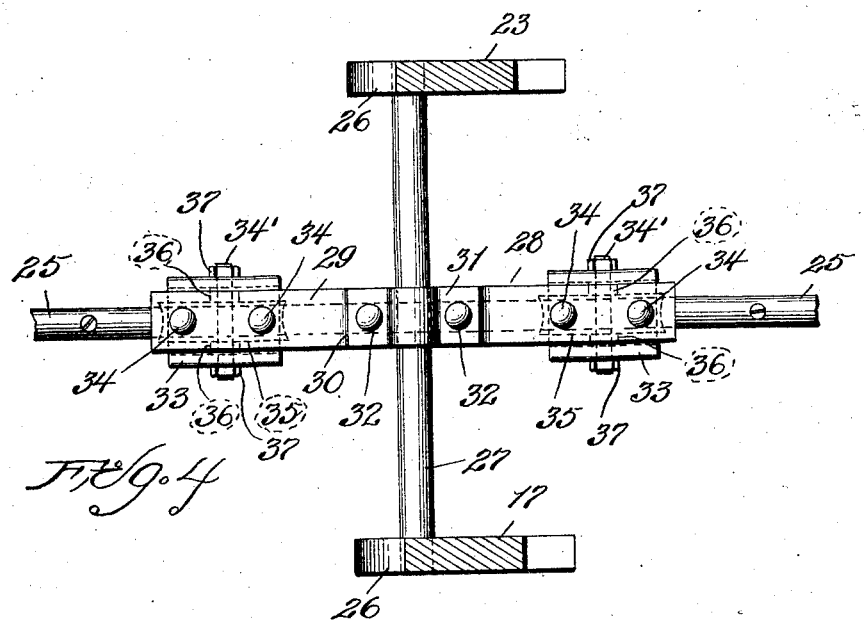
INVENTOR. GUSTAVE A. MILBRADT,
by Arthur C. Eckert ATTORNEY.